Jan. 12, 1960     E. R. CARPENTER     2,920,583
DOUGH DIVIDING MACHINE
Filed Nov. 15, 1956     8 Sheets-Sheet 4
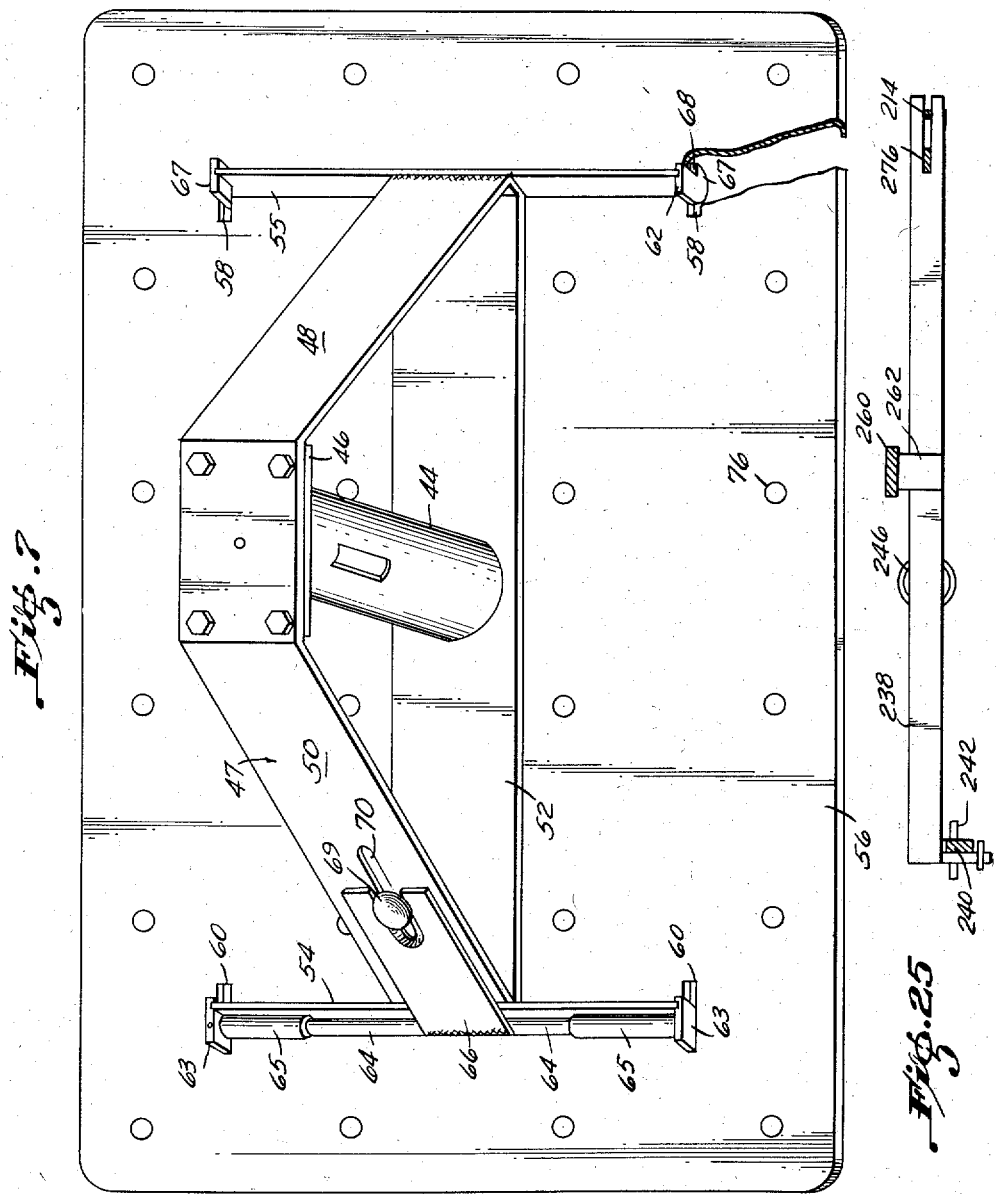
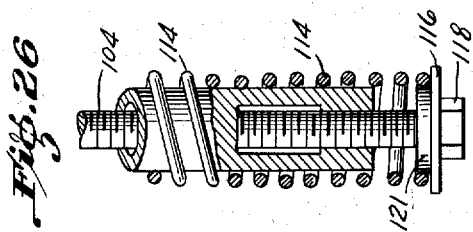
INVENTOR
EUGENE R. CARPENTER
BY
ATTORNEY

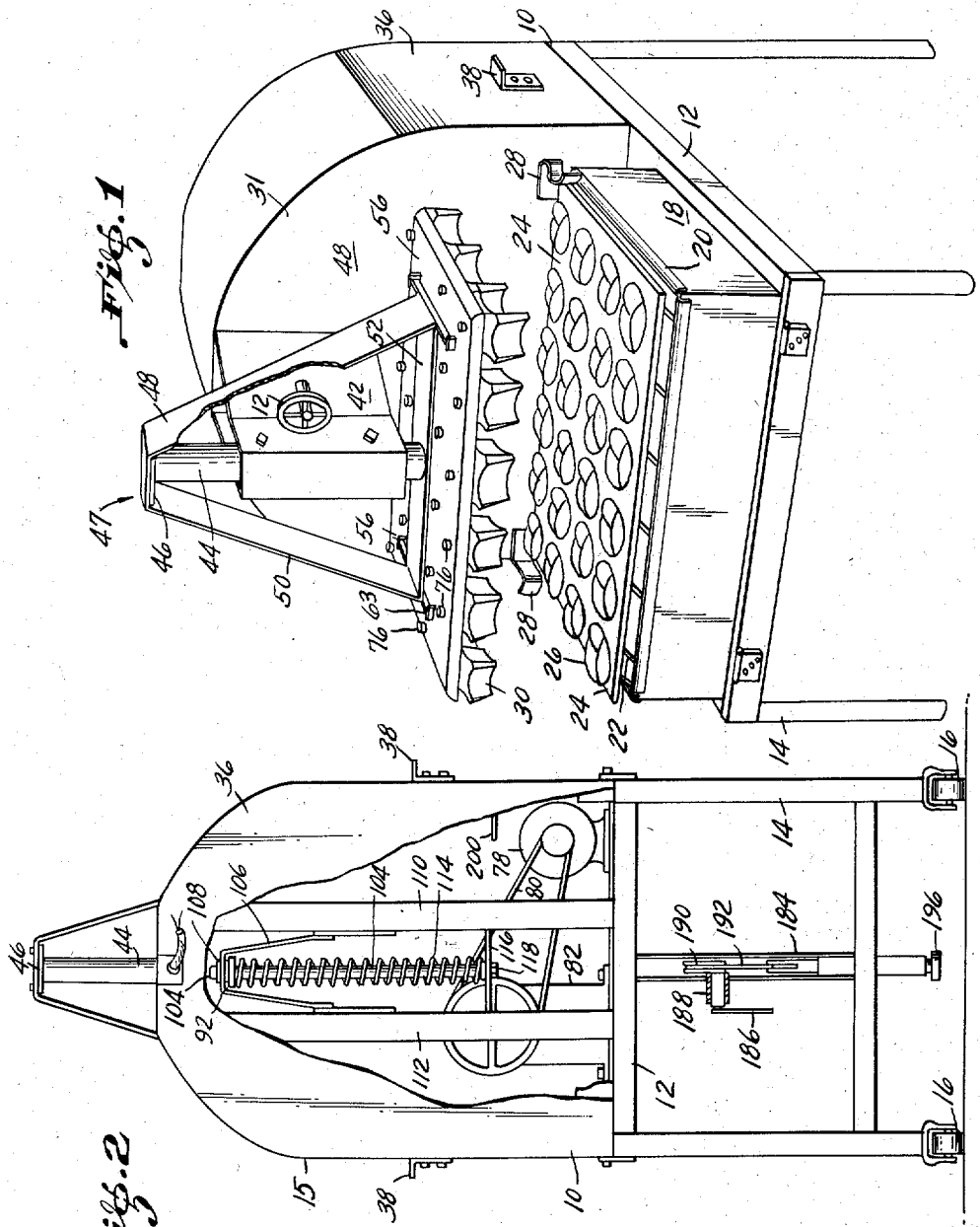
Jan. 12, 1960   E. R. CARPENTER   2,920,583
DOUGH DIVIDING MACHINE
Filed Nov. 15, 1956   8 Sheets-Sheet 1
INVENTOR
EUGENE R. CARPENTER Jan. 12, 1960  E. R. CARPENTER  2,920,583
DOUGH DIVIDING MACHINE
Filed Nov. 15, 1956  8 Sheets-Sheet 2
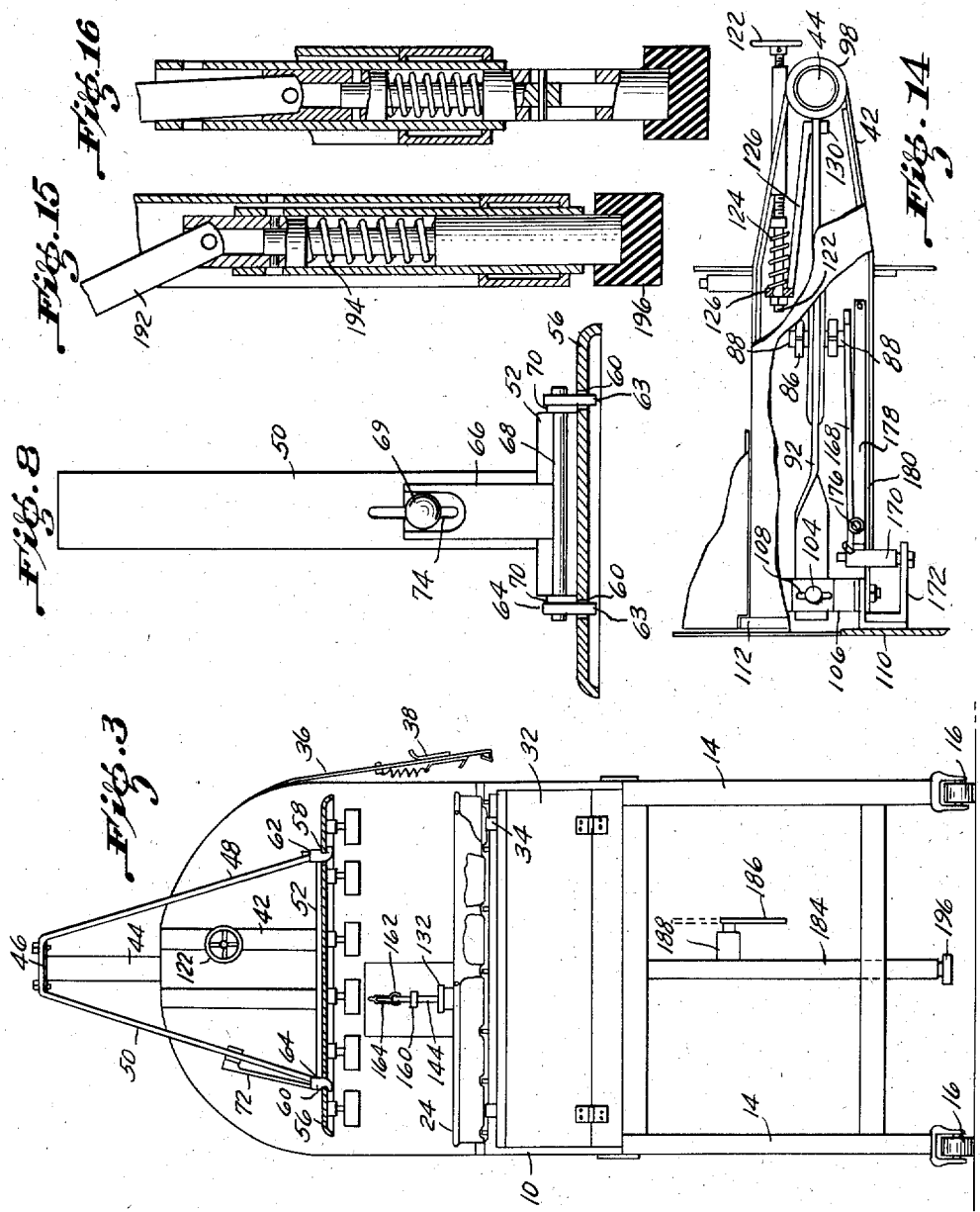
INVENTOR
EUGENE R. CARPENTER
BY
ATTORNEY

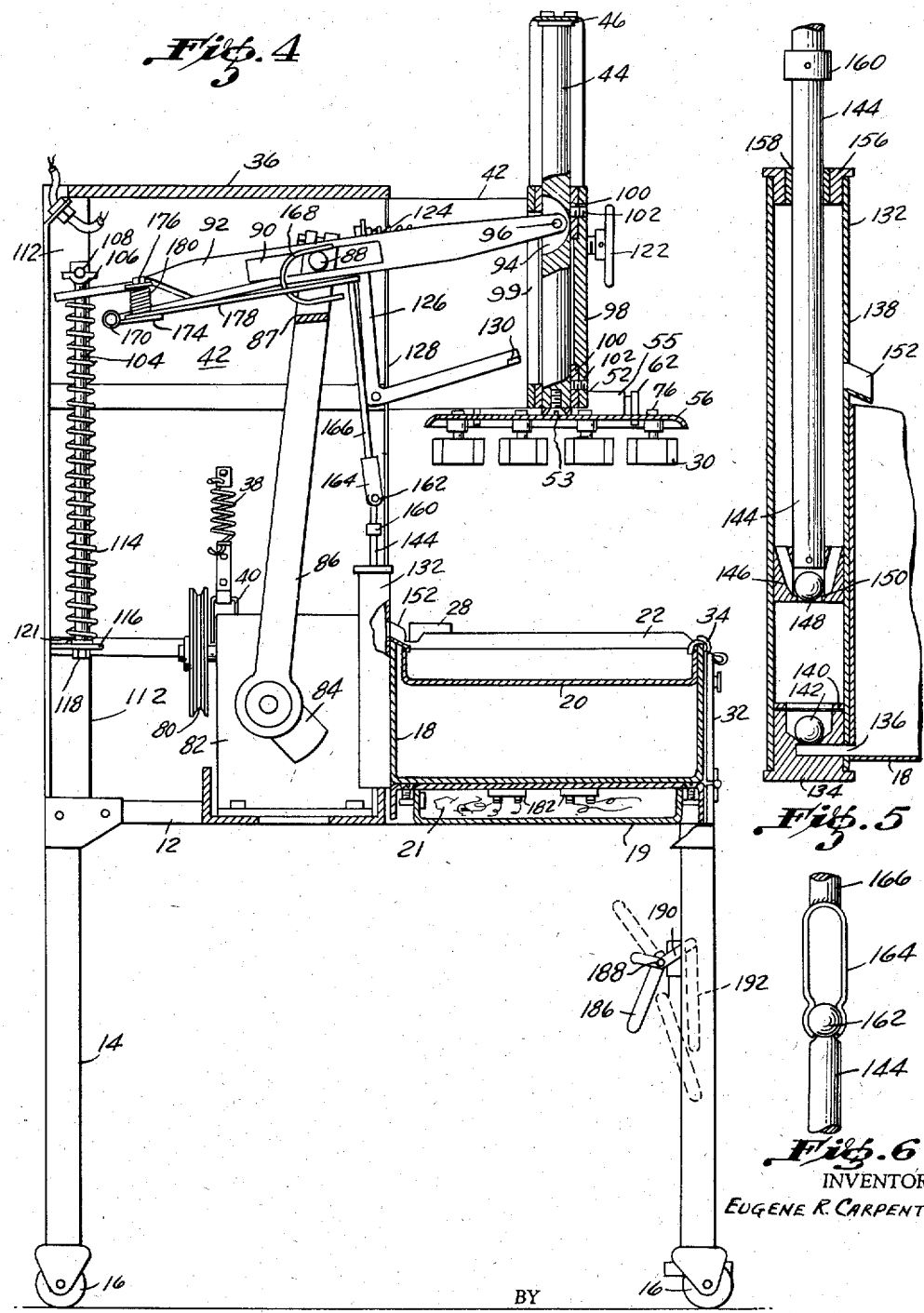

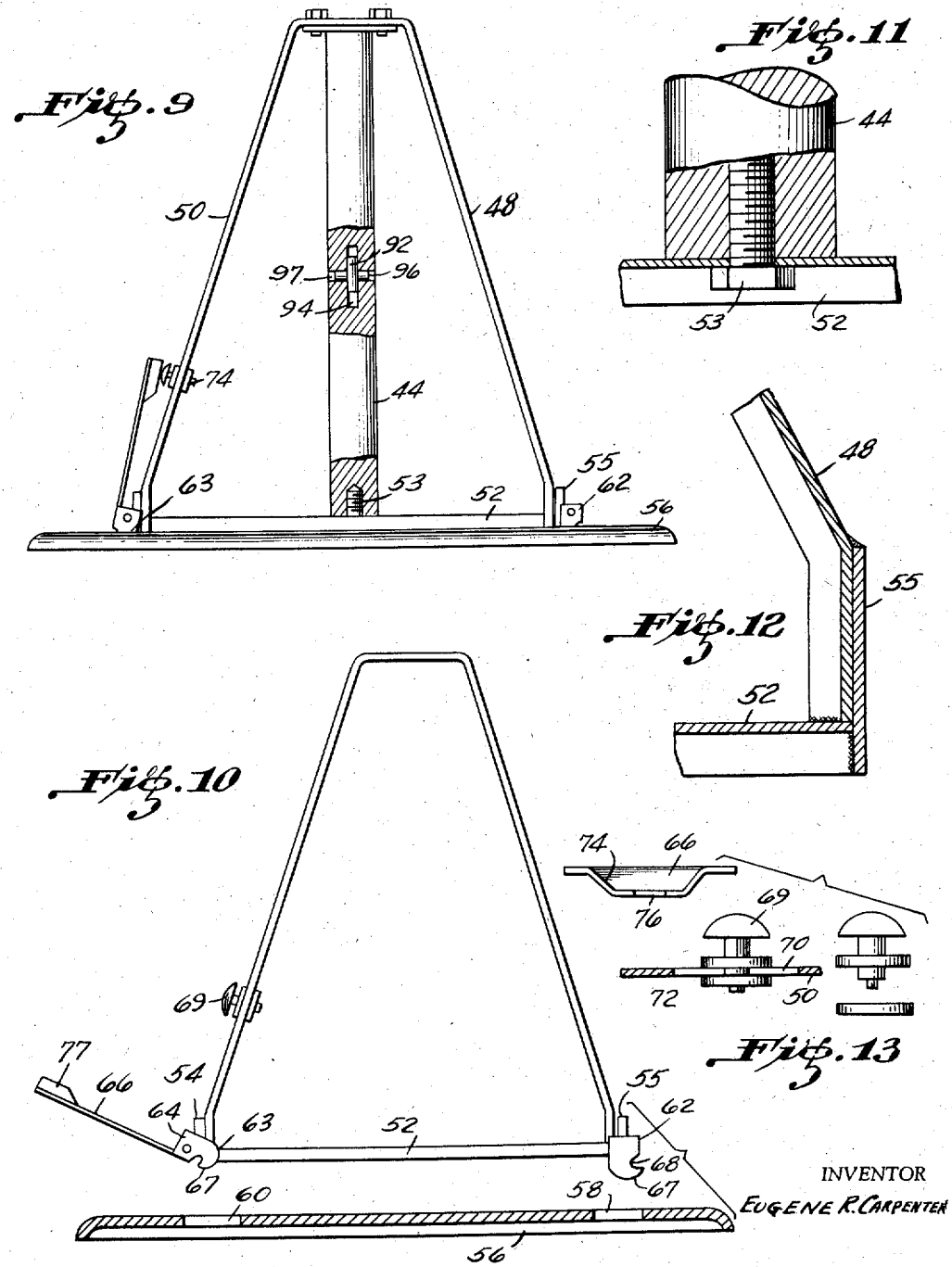

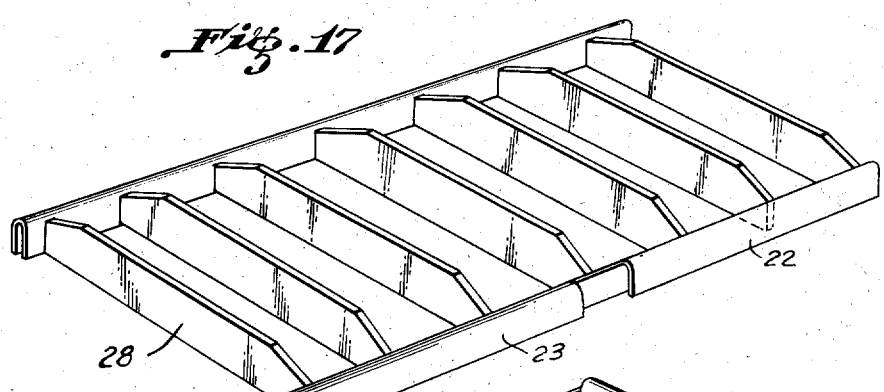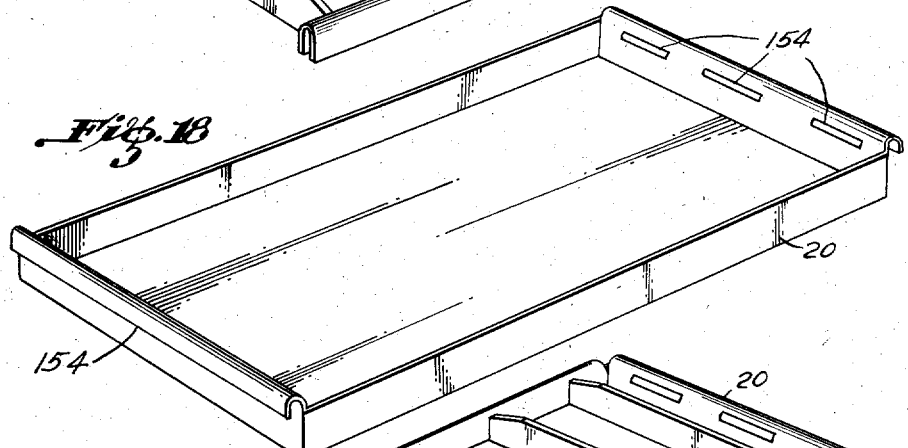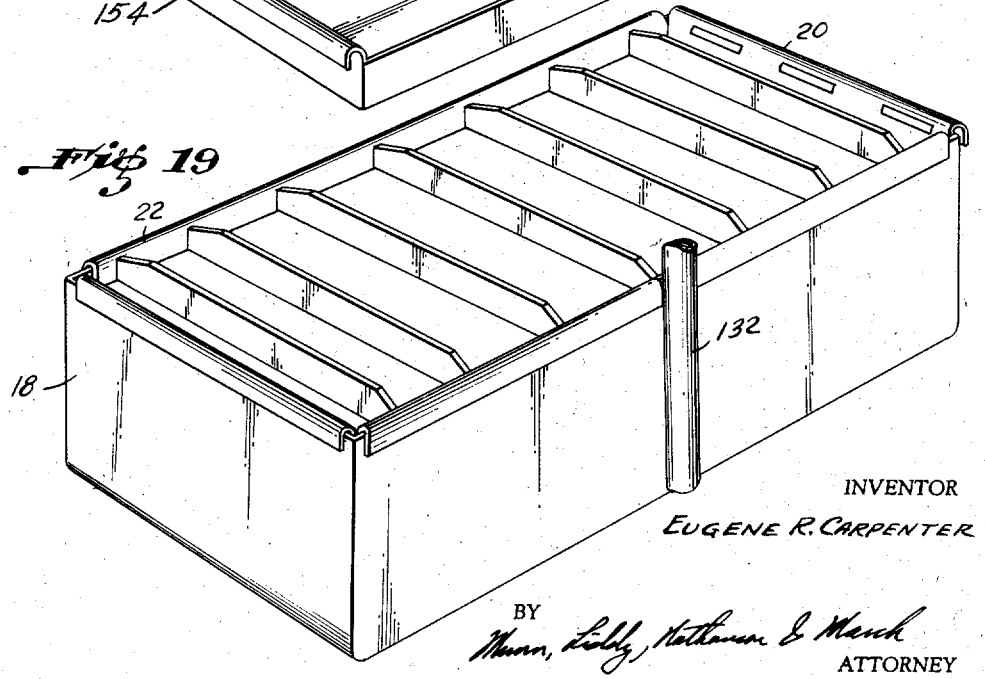

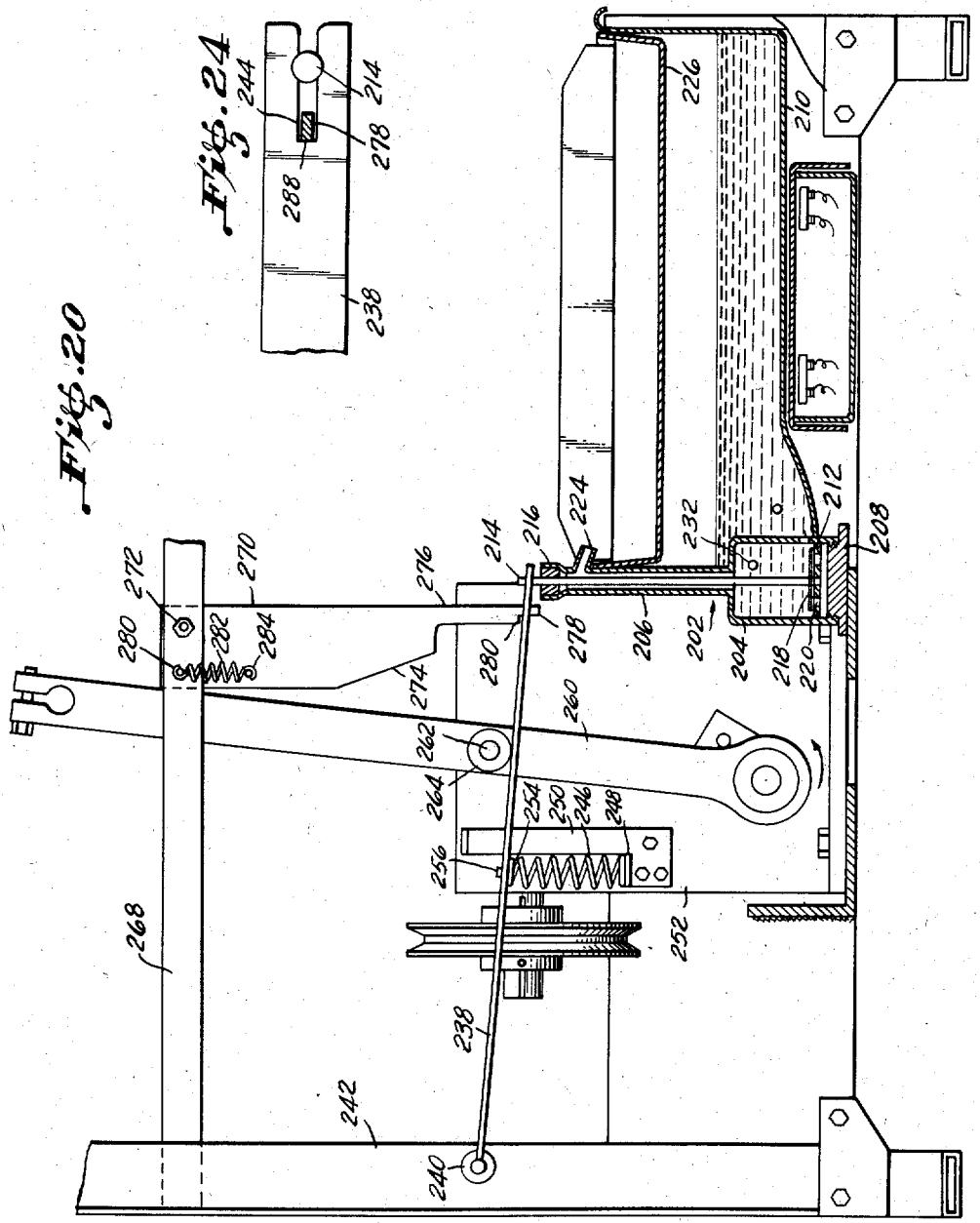

Jan. 12, 1960     E. R. CARPENTER     2,920,583
DOUGH DIVIDING MACHINE
Filed Nov. 15, 1956     8 Sheets-Sheet 8
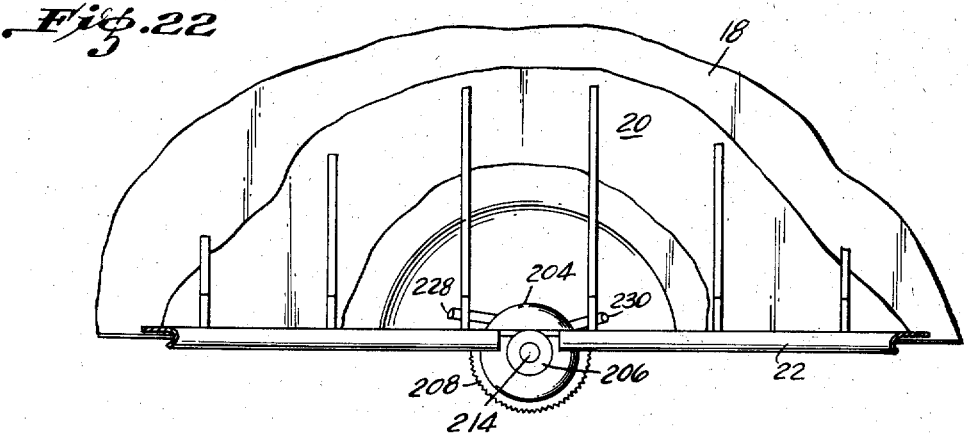
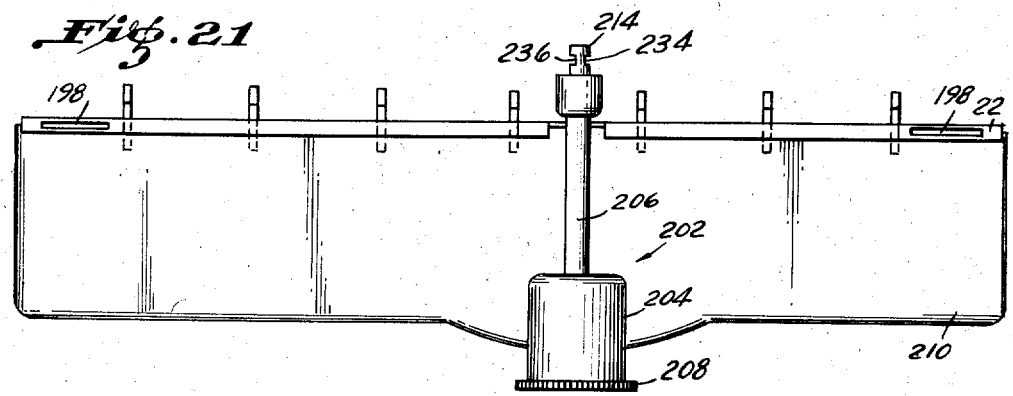
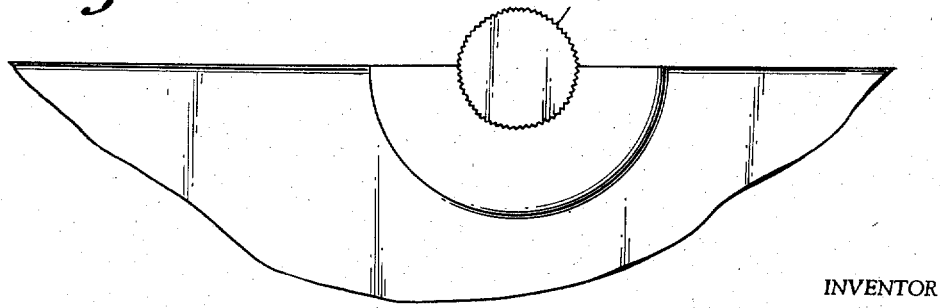
INVENTOR
EUGENE R. CARPENTER
BY
ATTORNEY

United States Patent Office 2,920,583
Patented Jan. 12, 1960

2,920,583
DOUGH DIVIDING MACHINE
Eugene R. Carpenter, Charlotte, N.C.
Application November 15, 1956, Serial No. 622,365
28 Claims. (Cl. 107—8)

This invention relates to a dough dividing machine; more particularly this invention relates to a machine for forming or cutting rolls such as brown and serve, Parker House, clover leaf, cinnamon, etc. where it is desirable to shape the dough or cut it into parts and while doing so to leave a film of butter (or cooking oil) on the dough at the parting lines so that after baking the roll can be readily pulled apart along the parting line.

The prime object of this invention is to provide an improved machine for dividing and shaping of rolls.

A further object of this invention is to provide a dough dividing machine having safety and adjustability features allowing the machine to divide doughs of different consistency.

Still a further object of this invention is to provide a dough dividing machine having novel means for placing a film of butter (or cooking oil) on the cutting blades before every dough dividing stroke.

Another object of my invention is to provide a novel rocker arm mechanism by means of which cutter devices for dividing dough can be resiliently reciprocated.

It is also an object of my invention to provide a means for interchangeably mounting dough cutters on a dough dividing machine which will facilitate use of the machine.

A still further object of the invention is to provide an adjustably resilient drive for dough dividing cutters.

Further objects and advantages will be explained in connection with the detailed description which follows.

For the purpose of explaining the invention, a preferred embodiment thereof has been illustrated in the accompanying drawings, in which the same reference characters have been used in all views to indicate corresponding parts and wherein:

Figure 1 is a front perspective view of a baking machine constructed in accordance with the invention.

Figure 2 is a back elevational view with some elements broken away to improve the showing.

Figure 3 is a front elevational view with some elements broken away.

Figure 4 is a sectional side elevational view with some elements broken away.

Figure 5 is a sectional elevational view on an enlarged scale showing a pump illustrated in Figure 4.

Figure 6 is a fragmentary elevational view illustrating a portion of the drive means for operating the pump of Figure 5.

Figure 7 is a fragmentary perspective view illustrating a portion of the apparatus seen in Figures 1, 3 and 4.

Figure 8 is a side elevational view partly in section of a portion of the apparatus illustrated in Figure 7.

Figure 9 is a front elevational view partly in section of the apparatus of Figure 7.

Figure 10 is a front elevational view figure similar to Figure 9 but illustrating the elements in a different position from that illustrated in Figure 9.

Figure 11 is a fragmentary elevational view illustrating a portion of the apparatus seen in Figure 9.

Figure 12 is a fragmentary sectional elevational view illustrating a portion of the apparatus illustrated in Figure 7.

Figure 13 is an elevational view illustrating portions of the apparatus seen in Figure 7.

Figure 14 is a fragmentary top plan view with some portions broken away.

Figure 15 is a fragmentary sectional elevational view on an enlarged scale illustrating a caster locking foot shown in Figure 3.

Figure 16 is a view similar to Figure 15 but illustrating the elements in a different position.

Figure 17 is a perspective view of a baking pan support.

Figure 18 is a perspective view of a service pan on which the support of Figure 17 is mounted when the elements are assembled.

Figure 19 is a perspective view illustrating an oil reserve pan and the service pan of Figure 18 and baking pan support of Figure 17 supported thereon.

Figure 20 is a fragmentary sectional elevational view similar to Figure 4 illustrating another form of pump and operating mechanism therefor.

Figure 21 is a fragmentary rear elevational view of the pump of Figure 20.

Figure 22 is a fragmentary top plan view of the pump of Figures 20 and 21.

Figure 23 is a fragmentary bottom plan view of the pump of Figures 20 and 22.

Figure 24 is a fragmentary sectional plan view illustrating a portion of the apparatus of Figure 20.

Figure 25 is a sectional plan view taken along line 25—25 of Figure 20.

Figure 26 is an enlarged detail showing of the cross arm compensating spring.

Referring now to the drawings and particularly to Figures 1, 2 and 4, the machine 10 comprises a table 12 mounted on detachable legs 14 equipped with casters 16 for portability. Upper frame 15 extends above table 12. Mounted on table 12 is reserve pan 18 with its associated assembly of service pan 20 and baking pan support 22 (Figs. 17, 18, 19). Figure 1 illustrates how a baking pan 24 containing rolls 26 is disposed on the reserve pan assembly, being properly aligned by a pair of side and end guides 28 under cutter blades 30. The baking pan is supported in front of a front panel 31 attached to frame 15.

The reserve pan assembly is held in place by door 32 and a pair of catches 34 mounted on the door.

Behind the pan assembly is a removable sheet metal cover 36 which extends over upper frame 15. Cover 36 serves to hide and protect the operating mechanism. Cover 36 is held in place by a pair of spring catches 38 which cooperate with table 12. Figures 3, 4 illustrate the construction of the spring catch 38 and how it serves to secure cover 36 by attachment to a loop 40 on table 12.

Bracket 42 which serves as support for a reciprocatory sliding head 44 extends through an aperture in front panel 31. A crossbar 46 is mounted at the top of sliding head 44, and a cutter support frame 47 is bolted to crossbar 46. The cutter support frame consists of side arms 48, 50 and spacer plate 52. Spacer plate 52 serves to hold the side arms rigid. Spacer plate 52 is fastened to the bottom of sliding head 44 by screw 53 (Fig. 11). The cutter support frame supports a pair of cutter catch support bars 54 and 55. A cutter plate 56 is adapted to be positioned below spacer plate 52. Referring to Figures 7, 9 and 10, cutter plate 56 has a pair of holes 58, 60 on each side. A pair of stationary catches 62 are fixedly secured to bar 55. The stationary catches fit in the pair of holes 58. A pair of movable catches 63 is mounted on bar 54. Catches 63 are adapted to be received in the pair of holes 60. The movable catches 63 are mounted on a shaft 64. Shaft 64 is pivotally supported by spaced channels 65 which are welded to bar 54. A plate 66 is integrally attached to shaft 64. The plate 66 constitutes an operating handle for rotating shaft 64.

Figures 7 and 9 illustrate the operating handle 66 in locking position in which the cutter plate 56 is locked to cutter support frame 47, and Figure 10 shows the handle in the unlocked position. In the latter position cutter plate 56 can be disengaged from cutter support frame 47. The catches are cut to form tongues 67 which can be inserted in the holes 58 and 60 and moved beneath the cutter plate 56. When in the latter position the cutter plate is received in the slots 68.

Figure 10 illustrates that the tongues 67 can be inserted into the holes 58 and 60 when handle 66 is rotated to the position shown in the latter figure. After the cutter plate 56 has been placed against spacer plate 52 with the tongue 67 projecting below the cutter plate, handle 66 can then be rotated to the position illustrated in Figures 7 and 9. When the latter is done the tongues will be forced beneath the cutter plate and the plate will be received within the slots 68.

Handle 66 can be locked in the locking position illustrated in Figures 7 and 9 by means of sliding bolt 69. The latter is slidably mounted in slot 70 of side arm 50 being held in position therein by means of washers 72 fixed to the bolt (see Fig. 13). The lower washer 72 can be secured to bolt 69 by any convenient means such as by peening the lower end of bolt 69. The end of handle 66 is dished as indicated at 74 and has a slot 76 within the dished portion thereof which is adapted to receive the bolt 69 when handle 66 is moved to the locked position as indicated in Figure 7 and bolt 69 is slid downwardly over the dished portion 74. A pad 77 can be positioned on the end of handle 66 to space the handle from arm 50 when in the locked position to facilitate grasping of the handle.

The cutter blades 30 are individually fastened to cutter plate 56, e.g. by bolts 76. Actually, the configuration of the cutter blades 30 and of pan support 22 depend upon the baking pan 24 being used, and the machine 10 would normally come equipped with pan supports and assembled cutter plates 56 in sufficient number and sizes to match the various baking pans in use, and the different rolls being made by a bakery. Individual cutter blades 30 can of course be taken off when necessary by removing bolts 76.

The operating mechanism of machine 10 comprises a motor 78 (Fig. 2) which is connected by a belt drive 80 to gear box 82 from which is driven crank 84 (Fig. 4). A connecting rod 86 is attached at one end to crank 84. The connecting rod is bifurcated at its other end 87. End 87 is connected to a pin 88 and pin 88 is mounted in a bearing 89 mounted in the reinforced portion 90 of a cross arm 92. One end of cross arm 92 fits into a slot 94 in sliding head 44 and is pivotally secured there by a pin 96 force fitted in slot 97. A tube 98 is connected to bracket 42 and sliding head 44 is slidably mounted in tube 98. Tube 98 is slotted at 99 to allow up and down movement of cross arm 92. A pair of bushings 100 which guide sliding head 44 are secured inside tube 98, e.g. by set screws 102. These bushings 100 may be partially or completely slotted if necessary to allow up and down movement of cross arm 92.

The other end of cross arm 92 is pivotally and slidably mounted on a rod 104. Rod 104 is suspended from a yoke shaped bracket 106 overlying cross arm 92 by means of a pin 108. Yoke shaped bracket 106 is bolted to frame members 110, 112, on table 12 (Figure 2). A compression spring 114, mounted on rod 104 beneath cross arm 92, ordinarily bears against plate 116 and cross arm 92 and maintains the end of cross arm 92 at the top of rod 104 up against bracket 106. Plate 116 is connected to the lower end of rod 104 by means of a bolt 118 which is in turn threadingly supported within the rod 104. A spacer 121 is supported on plate 116 and maintains the lower end of the spring concentric with respect to the bolt 118. Bolt 118 can be rotated within the hollow interior of rod 104 to adjust the compression of spring 114. A fine thread can be used. When the machine 10 is running idle, cross arm 92 pivots on its connection to rod 104 and all the motion of connecting rod 86 is transmitted to sliding head 44. However, if a baking pan, e.g. member 24 is placed in position under cutter plate 56, then when the cutters 30 reach the bottom of the pan 24, the resistance of the pan bottom to cutters 30 is transmitted to cross arm 92 and to its connection on rod 104. The resisting force is sufficient to overcome the yield point of spring 114 and allow cross arm 92 to slide downward on rod 104. Thus when sufficient resistance to cutters 30 is encountered, the continuing movement of crank 84 and connecting rod 86 causes cross arm 92 to pivot about pin 96 allowing sliding head 44 to remain stationary. Similarly if any object is accidentally placed in the way of the cutters 30 while the machine 10 is operating, spring 114 will yield, thereby preventing accidents to personnel and damage to the machine.

The amount of pressure exerted by cutters 30 on the dough 26 in a baking pan 24 can be varied to suit such conditions as the dough consistency. A hand wheel 122 mounted on bracket 42 can be turned to compress or loosen an impact spring 124 (Fig. 7), which bears against one end of a rocker arm 126 (Fig. 4), pivotally attached to a frame member 128 of table 12. The free end of rocker arm 126 has a lug 130 extending out into the path of cross arm 92. The stress on spring 124 determines the position of rocker arm 126.

Thus when cross arm 92 is moved downward by connecting rod 86 it contacts lug 130, rotating rocker arm 126 and thereby compressing spring 124. The compression of spring 124 lessens the downward pressure being exerted by cutter plate 56.

Turning hand wheel 122 in a direction tending to compress spring 124 causes the spring to bear against the end of rocker arm 126, raising lug 130. As a result, downward movement of cross arm 92 will compress spring assembly 124 to a greater degree. The force exerted by cutters 30 is diminished to an extent in accordance with the position of hand wheel 122. The maximum retarding force exerted by spring assembly 124 is preferably less than the yield point of spring 114. Accordingly when the machine is idling cutter plate 56 will always descend to the limit.

In normal operation an idling downstroke dips cutters 30 past the ribs of pan support 22 down into the melted butter or cooking oil in service pan 20.

A constant level of melted butter or cooking oil is maintained in service pan 20 by means of a pump 132 (Fig. 5). Pump 132 has an inlet port 134 disposed in alignment with an opening 136 in the side of reserve pan 18 (see Figs. 4 and 5). As seen in Fig. 5, the pump 132 comprises cylindrical body 138 sealed at its bottom by valve 140 comprising a caged ball 142 seated to seal inlet port 134 except when suction is applied by upward movement of a pump shaft or rod 144. At the bottom of pump rod 144 is secured an outlet valve 146 comprising a caged ball 148 normally seated on a valve port 150. The cylindrical outer surface of valve 146 is in close sliding fit with the inner surface of pump cylinder 138. The melted butter or cooking oil being pumped serves to lubricate the valves 140, 146 and the wall of cylinder 138. Above valve 146 there is an outlet spout 152 through which the pumped butter or cooking oil pours into service pan 20 (Fig. 4). Any excess butter or cooking oil pumped into service pan 20 drains back into the reserve pan through openings 154 in the walls of pan 20 (Fig. 18).

The top of pump cylinder 138 is closed by a plug 156 in which a bearing 158 is mounted. A stop collar 160 mounted on pump rod 144 serves to prevent the rod from being depressed so far as to damage the valves. Desirably pump 132 is integrally attached to reserve pan 18, e.g. by welding or brazing pump cylinder 138 to the back wall of pan 18. To permit removing and replacing the integrally attached reserve pan and pump, pump rod 144 is removably connected to a pump operating mechanism.

The pump rod 144 terminates in a nob 162. A spring clip 164 (Fig. 6) connected to the bottom of operating rod 166 fits around knob 162. A slight lateral displacement serves to disconnect spring clip 164 from the knob end of pump rod 144. Operating rod 166 is activated from the elongated pin 88 which connects cross arm 92 and connecting rod 86. As shown in Figs. 4 and 14 pin 88 extends out between the arms of a yoke 168 so that when connecting rod 86 moves up or down pin 88 contacts yoke 168 causing it to pivot on a rock shaft 170. The rock shaft 170 is pivotally mounted on a bracket 172 secured to the frame member 110 of table 12. Rock shaft 170 carries a tab 174, to which is secured an upright shaft 176. One end of a pump operating arm 178 is mounted on shaft 176 and the other end is attached to pump operating rod 166. Spring 180 is mounted on shaft 176 so as to normally force pump operating arm 178 and rod 166 to follow the downward movement of tab 174 as the connecting rod pin 88 lowers yoke 168 and thereby pivots rock shaft 170. Because pin 88 has a greater up and down movement than pump rod 144 the yoke 168 and its associated structure provide a lost motion connection between pin 88 and operating rod 166. Also if motor 78 is started before electric heaters 182 (Fig. 4) which are attached to pan 18, surrounded by cover 19 and above asbestos 21 within cover 19, warm up the butter in reserve pan 18, the resistance of the congealed butter to pumping is sufficient to overcome the yield point of spring 180 and hold operating arm 166 stationary until the butter has warmed up enough to allow pumping. Thus the yoke 168 and its associated structure, particularly that of spring 180, also acts as a safety means preventing damage to pump 132.

To allow portability, the legs 14 of machine 10 are provided with casters 16, but for operation it becomes desirable to fix the position of the machine. For this purpose at least one of the legs 14 is equipped with a pressure foot device 184. The actuating mechanism of pressure foot device 184 (Figs. 2, 4, 15 and 16) comprises a hand lever 186 secured to a shaft 188. A link 190 is integrally attached to the shaft 188 at one end and pivotally attached to a pressure arm 192 at the other end. Pressure arm 192 is attached to spring assembly 194. Raising hand lever 186 rocks shaft 188 forcing link 190 down and as a result spring assembly 194 forces a pad 196, suitably of rubber, into contact with the floor. Lowering hand lever 186 releases the spring assembly, raising pad 196 from contact with the floor. Levers 186, 190 and 192 are connected so as to form an "overcenter" relationship when the pad is forced against the floor.

The operation of the dough dividing machine 10 is as follows: The reserve pan 18 is filled about two-thirds full with butter or other cooking oil, the empty service pan 20 is then placed inside reserve pan 18 so that its U-shaped ends fit over the ends of the reserve pan. Then pan support 22 is placed so that its U-shaped sides 23 fit over the sides of pan 18. The two pan guides 28 are then slipped over the rear side of pan support 22 at the corners. This entire assembly is then placed on table 12 so that a pair of locating strips 198 fit into slots 200 in the front of panel 31. Closing the hinged door 32 positions catches 34 over the front side of pan support 22 and serves to hold the pan assembly rigidly in place. The fit of locating strips 198 into slots 200 serves to insure that the pan assembly is properly positioned relative to cutter blades 30. At this point heaters 182 may be turned on to warm the oil inside reserve pan 18. The pump 132 is connected by snapping knob 162 at the top of pump rod 144 into clip 164.

An appropriate cutter plate 56 is connected to sliding head 44 by first slipping stationary catches 62 into the holes 58 on the cutter plate 56 to be used. Next the movable catches 63 are connected to the cutter plate 56. The handle 66 is released by sliding bolt 69. Rotating the handle 66 turns catch members 63 sufficiently to permit their movement into holes 60. The handle 66 is then returned to engaged position with bolt 69 locking movable catch members 66. With the cutter plate 56 thus set in position on sliding head 44, the motor may be turned on.

By this time butter if used in reserve pan 18 may not be sufficiently melted to permit pump 132 to force the butter into service pan 20. However, yielding of spring 180 under the abnormal resistance of pump 132 allows the pump rod 144 to remain stationary until the butter is melted. At any rate with heaters 182 on, continued operation of the motor and the resulting movement of connecting rod 86 eventually causes the pump 132 to fill service pan 20 to the level of overflow slots 154. Excess oil pumped into service pan 20 flows back through slots 154 to the reserve pan 18. During this idling period, as cross arm 92 is reciprocated by connecting rod 86, it pivots about its connection to rod 104 and as a result reciprocates sliding head 44 up and down with the maximum movement possible. The down stroke of sliding head 44 is sufficient to dip cutter blades 30 into the liquid in service pan 20. It should be noted that pan support 22 is constructed and positioned so that the cutter blades 30 pass down between the ribs of the pan support.

As soon as there is enough liquid in service pan 20 to wet cutters 30, dough dividing can begin. A preferred arrangement for dividing the dough is to position a baking pan 24 on the machine once every other down stroke of sliding head 44. In this manner there is an idle stroke and a service stroke. As the cutter plate 56 rises above pan support 22, a baking pan 24 is placed on the pan support between guides 28. On the subsequent service stroke, cutter blades 30 divide the dough 26 and simultaneously leave a film of oil on the parting lines of the dough. Damage to either cutter blades 30 or baking pan 24 is prevented by the fact that spring 114 yields when the cutter blades reach the baking pan bottom and the resistance to their downward force is increased by contact with the metal of the pan. When spring 114 yields the continued downward motion of connecting rod 86 and cross arm 92 results in pivoting of cross arm 92 about pin 96 with no motion of sliding head 44 as the result. Of course connecting rod 86 soon reaches its lowermost position and then moves upward to relieve the pressure on spring 114 and on cutter blades 30.

Hand wheel 122 is turned to adjust spring 124 in accordance with the consistency of the dough being divided; the shock with which cutter blades 30 contact the pan bottom on the service stroke is minimized by properly setting hand wheel 122.

Figures 20 to 24 show another form of pump and operating mechanism therefor. Pump 202 comprises a cylinder 204 and a piston rod housing 206. The lower end of the cylinder is closed by a cap 208. Cap 208 is threadingly connected to cylinder 204. The reserve pan 210 is cut away so as to partially receive cylinder 204 and piston rod housing 206, and pump 202 is connected to reserve pan 210 by welding or brazing. The reserve pan and pump thus form a single unit.

Piston 212 is connected to piston rod 214, and is adapted to be reciprocated in cylinder 204 by means of operation of rod 214. The upper end of housing 206 is formed to receive a packing bearing 216. Rod 214 is reciprocatingly mounted in the packing bearing; the reserve pan and pump form a single unit. A disc valve 218 rests on piston 212 and is loosely mounted on rod 214. Two ports 220 extend through piston 212. The ports 220 are adapted to be closed by valve 218. Inlet port 222 is formed in the side of cylinder 204 and interconnects the reserve pan with the interior of the cylinder 204. With the piston in the position illustrated in Figure 20 the butter or other cooking oil can flow into the interior of cylinder 204 above piston 220 and disc valve 218. However, when the piston is raised the butter will flow in below piston 212. The ports 220 in valve 212 permit the piston to move downwardly in cylinder 204 despite the fact that there may be a quantity of butter below the piston. As the piston moves downwardly disc 218 will move upwardly on shaft 214 and the butter will flow through ports 220 from a position below the piston to a position above the piston. As the piston is moved upwardly disc 218 will prevent the flow of butter from above the valve to below the valve and thus the butter will be forced upwardly. Piston rod 214 is spaced from the interior of housing 216 and the butter can flow between the rod and the interior of the housing up to an outlet opening 224 and into service pan 226.

Tubes 228 and 230 are connected to opposite sides of the cylinder 204 within the reserve pan 210, and the cylinder has outlet ports 232 aligned with the tubes 228 and 230. These outlet ports and tubes are adjacent the upper end of cylinder 204 and the tubes extend outwardly toward opposite sides of the reserve pan 210. Thus when piston 212 is moved upwardly in cylinder 204 the butter or other mixture is not only forced outwardly through outlet port 224 but through tubes 228 and 230. The purpose for the latter is to agitate the butter within the reserve pan. Often ingredients such as sugar, cinnamon, etc. are added to the butter or other cooking oil and it it necessary to maintain these elements in suspension. This is accomplished by forcing jets of butter out through the tubes 228 and 230. I have thus provided a means for agitating the cooking oil mixture as the pump is operated.

Rod 214 is slotted on opposite sides adjacent its upper end. The slots 234 and 236, which are clearly illustrated in Figure 21, form vertically spaced opposed shoulders on the rod. Operating arm 238 is pivotally received adjacent one end in bearing 240 and the latter is welded to the upper frame 242. At its opposite end operating arm 238 is slotted as illustrated in Figure 24. Slot 244 receives the slotted portion of rod 214 and the shouldered rod is thus forced to move vertically with the movements of operating arm 238. A compression spring 246 is supported on a flange 248 connected to bracket 250. The latter is fastened to the side of the gear box 252. The upper end of spring 246 presses against a pad 254 fastened to arm 238 by rivet 256. Connecting rod 260 has a shaft 262 on which is mounted a roller 264. Spring 246 urges arm 238 against roller 264. When the connecting rod moves downwardly the roller will force the operating arm downwardly in turn forcing the piston 212 downwardly in cylinder 204. As the connecting rod moves upwardly however the spring 246 can force arm 238 upwardly about its pivotal connection to bearing 240 if it is not prevented from doing so by some other means.

The oil would be forced through tubes 228 and 230 as the connecting rod 260 rises with a smooth uniform action governed by the speed of the connecting rod 260, if the arm 238 were allowed to continue to bear against roller 262 as the connecting rod moved upwardly. Instead of allowing this more gentle upward motion I provide a means for insuring a sudden snap-like action which results in a stream of considerable force flowing outwardly through the tubes 228 and 230.

As illustrated in Figure 20 frame 268 is connected to the upper main frame member 242 and forms a part thereof. A hold down latch 270 is pivotally connected to frame member 268 as by a bolt 272. Latch 270 has a cam surface 274 and a lower arm 276. The latter has a projecting finger 278 normally received within slot 244. The finger projects downwardly from a shoulder 280. A spring 282 of the extension type is connected to pin 284 on hold-down latch 270 and a pin 286 on frame member 268. The spring normally urges latch 270 clockwise about bolt 272, as illustrated in Figure 20, and thus latch 270 is urged in a direction such that the projecting finger is urged against the base 288 of slot 244. When the operating arm 238 is forced to its lowermost position the spring 282 will force the projecting finger 278 against base 288 and shoulder 280 will overlie the operating arm 238. Thus as connecting rod 260 moves upwardly the operating arm 238 will be retained in a downward position by latch 270.

Latch 270 and its cam surface 274 are positioned so that roller 262 will bear against cam surface 274 as the connecting rod 260 moves toward its uppermost position. As the rod continues to move upwardly latch 270 will be rotated counter clockwise about bolt 272 by roller 262. As this counter clockwise rotation continues a point is reached at which arm 238 is released and the bifurcated ends thereof can move upwardly over lower arm 276 of latch 270. As this upward movement is an instantaneous movement the result is that a sudden surge is imparted to the fluid within cylinder 204 and the solution is shot outwardly through the tubes 228 and 230. With spring 246 connected to flange 248 and pad 254 on operating arm 238 the upward movement of the operating arm is dampened by the spring 246 as it is extended beyond its normal free length. As the connecting rod 260 moves downwardly roller 262 will again contact arm 238 and force piston 212 downwardly in cylinder 204, and when arm 238 moves below shoulder 280 latch 270 will again engage the operating arm.

While I have shown and described a preferred form of my invention it will be understood that variations in details and form may be made without departure from the invention as defined in the appended claims.

I claim:

1. A dough forming machine comprising a frame, a reciprocating structure including a head, a dough forming means mounted on said head, a service pan adapted to contain oil mounted on said frame beneath said dough forming means, means for supporting a dough containing pan on said service pan beneath said dough forming means, means connected to said head for reciprocating said head, the last named means including an arm resiliently connected to said frame, means for oscillating said arm to move said head towards said service pan, the last named means having a uniform stroke, said resilient means being yieldable during a uniform stroke of said means for oscillating said arm to accommodate completion of the stroke of said last named means upon said head encountering a resistance during movement thereof.

2. The apparatus of claim 1 including means mounted on said frame projecting into the path of movement of said structure adapted to resiliently resist the normal movement of said head toward said pan.

3. The apparatus of claim 2 wherein said last named means is adjustable in amount of force supplied to said structure.

4. The apparatus set forth in claim 1 including a reservoir adapted to contain a quantity of oil, pump means conected to said reservoir and said service pan for pumping oil from said reservoir to said service pan, means connecting said pump means to said means for reciprocating said head for actuation of said pump means in timed relationship with the movement of said means for reciprocating said head.

5. The apartus of claim 1 including said dough forming means comprising cutter blades, said cutter blades being mounted on a plate, said plate being removably secured to said reciprocating head.

6. A dough dividing comprising a frame, a dough forming means, means reciprocating said dough forming means on said frame, a pan, said pan being positioned in the path of movement of said dough forming means during reciprocation thereof, means for reciprocating said dough forming means embodying an arm pivotally connected to said dough forming means, means resiliently supporting said arm on said frame, means for moving said arm to cause reciprocation of said dough forming means, said arm being pivotal about its point of contact with said resilient means during normal reciprocating movement of said dough forming means, said means for moving said arm being operable to move said dough forming means towards said pan upon pivotal movement of said arm with respect to said resilient means, said resilient means being yieldable when said dough forming means encounters a resistance to reciprocation, said arm being pivoted about its point of connection to said head when the resistance to movement of said dough forming means is sufficient to deform said resilient means.

7. A dough dividing machine comprising a frame, a reciprocating head, a dough forming means mounted on said head, means for supporting a pan containing dough in alignment beneath said dough forming means, means for reciprocating said head to move said dough forming means towards the latter means for supporting said pan, said means for reciprocating said head comprising an arm pivotally secured at one end to said head, means resiliently supporting said arm on said frame adjacent an opposite end of said arm, the last named means being yieldable when subjected to a predetermined load, a connecting rod connected to said arm intermediate said ends of said arms, means for moving said conecting rod to cause reciprocating movement of said arm and resulting reciprocatory movement of said head toward said means for supporting said pan, said resilient means being resiliently yieldable in a direction approximately parallelling the path of reciprocatory movement of said head whereby said resilient means will yield when said dough forming means strikes a pan supported on said means for supporting said pan and said means for actuating said connecting rod will continue to operate said rod in a predetermined path of movement.

8. The apparatus of calim 7 including an arm pivotally supported on said frame, said arm extending into the path of movement of said means for reciprocating said head, resileint means connected to said frame and the last named arm adapted to resiliently resist movement of said arm in a direction parallelling the movement of said means for reciprocating said head during movement of said head toward said means for supporting said pan, the last named arm being engageable by said means for moving said head during the movement of said head toward the means for supporting said pan.

9. The apparatus of claim 8 wherein the last named resilient means is adjustable to adjust the force exerted thereby on the last named arm.

10. A dough dividing machine comprising a reciprocating head, a dough forming means mounted on said head, a pan for containing oil mounted beneath said dough forming means in the path of movement thereof during reciprocation of said head, a reservoir supported on said frame, a pump connected to said reservoir and to said service pan, means for reciprocating said head, means connecting the means for reciprocating said head to said pump operable to actuate said pump in timed relationship with the reciprocating movement of said head.

11. The apparatus of claim 10 including, the means connecting said pump to said means for reciprocating head comprising a resilient means yieldable when said pump offers an abnormal resistance to operation and adapted to continue movement of said head in the event said timed operation of said pump with respect thereto should fail.

12. A dough dividing machine comprising a frame, a rocker arm movably mounted on said frame, cutter blades connected to said rocker arm, means for supporting a baking pan, said means for supporting a baking pan lying in the path of movement of the cutter blades when said blades are moved by said rocker arm, said blades being normally movable from a position from one side of said means for supporting said baking pan to the opposite side of said means for supporting said baking pan, said means for movably mounting said rocker arm including resilient means operable upon engagement of said cutter blades with a baking pan supported on said means for supporting said baking pan to yield and prevent damage to said pan and said blades.

13. A dough dividing machine comprising a frame, a rocker arm movably mounted on said frame for movement in a first direction, means for moving said rocker arm in said first direction and in a direction opposite thereto, means for supporting cutter blades on said rocker arm, a baking pan support positioned in the path of movement of said means for supporting said cutter blades, cutter blades mounted on the last mentioned means, said cutter blades being movable through said means for supporting said baking pan support during movement of said cutter blades in said first direction, said cutter blades being engageable with a bottom of a baking pan when said pan is supported on said baking pan support during movement of said cutting blades in said first direction, means for continuing movement of said rocker arm in said first direction when said cutting blades strike the bottom of said baking pan including resilient means connected between said rocker arm and said frame.

14. In a dough dividing machine a baking pan support, cutter blades movable through said baking pan support in a reciprocating manner, means for reciprocating said cutting blades to move said blades from one side of said support to the opposite side including a rocker arm, said rocker arm being movably mounted on the frame of said dough dividing machine by means including a resilient device, said resilient device being adapted to yield when said cutter blades strike the bottom of said baking pan.

15. In a dough dividing machine, a frame, a crank shaft, a rocker arm connected to said crank shaft and movable in a reciprocating manner thereby, said rocker arm being pivoted adjacent one end by means connected to said frame of said dough dividing machine, cutter blades pivotally connected to the opposite end of said rocker arm, said cutter blades being adapted to strike the bottom of a baking pan supported within the path of movement of said cutter blades when moved by movement of said rocker arm, said means connected to said frame for pivoting said one end of said rocker arm on said frame including a resilient means yieldable when said cutting blades strike said baking pan bottom.

16. The apparatus of claim 15 in which said cutter blades are removably connected to said rocker arm.

17. The apparatus of claim 16 in which said means for removably connecting said cutter blades to said rocker arm comprises a movable catch and a stationary catch, both of said catches being engaged with said cutter blades when in normal position, said movable catch and said stationary catch comprising means adapted to receive a plate to which said cutter blades are connected, said last named plate having slots therein in which said catches are insertable, each of said catches having a tongue and a slot with the tongues normally lying beneath said plate and said plate being received in the slots in said catches, the slots of the catches facing in opposite directions, said movable catches being rotatable to move said plate out of the slots in said movable catches, and to disengage said catches from said plate, and means for locking said movable catches in engaged relationship with said plate.

18. In a dough dividing machine a rod vertically supported in said machine, a spring mounted on said rod, a rocker arm, the end of said rocker arm receiving said rod and being movable therealong, a spring on said rod normally urging said end of said rocker arm upwardly in a vertical direction, the opposite end of said rocker arm being connected to a cutter blade, means for operating said rocker arm comprising a crank arm, said crank arm being operably connected to said rocker arm and said rocker arm being normally pivotal about its point of connection to said rod by movement of said crank arm, said cutter blade being movable in a reciprocating manner through movement of said rocker arm under influence of said crank arm, a baking pan, means for supporting said baking pan below said cutter blade, said cutter blade being engageable with the bottom of the baking pan supported on the last named means as said rocker arm reciprocates through action of said crank arm, said spring being adapted to yield and permit downward movement of said first end of said crank arm when said cutter blade strikes the bottom of said baking pan.

19. In a dough dividing machine a baking pan support, cutter blades reciprocatingly mounted above said baking pan support and engageable with the bottom of a baking pan when said baking pan is supported on said support, means for reciprocating said cutter blades comprising a cross-arm pivotally connected to said cutter blades adjacent one end of said cross-arm, means for moving said one end of said cross-arm downwardly to move said cutter blades downwardly into contact with said bottom of said pan comprising a crank arm connected to said cross-arm, the other end of said cross arm being resiliently supported by means on said frame and being normally pivotal with respect to the last named means as said cutter blades move downwardly toward said pan bottom, the last named means being yieldable for movement of said other end downwardly when said pan bottom is struck by said cutter blades.

20. A dough dividing machine comprising a frame, a baking pan support adapted to support a baking pan, cutter blades positioned above said support and reciprocatingly mounted for movement toward and away from said support and adapted to strike the bottom of a baking pan mounted on said support, means for moving said cutter blades comprising an operating arm, one end of said arm being pivotally connected to said cutter blades, the opposite end of said arm being movably supported on said baking machine frame by means comprising a spring and a rod, said opposite end of said arm normally receiving said rod, said spring normally maintaining said opposite end on a fixed position on said rod but being yieldable for movement of said opposite end longitudinally with respect to said rod, the connection between said rod, spring and said opposite end of said arm being such as to normally provide a pivotal support for said opposite end of said arm at a fixed point on said rod, means for operating said arm to cause movement of said blades toward said support, the point of pivotal support for said opposite end of said arm being movable along said rod whenever said cutter blades strike the bottom of said pan.

21. The apparatus of claim 20 including a rocker arm pivotally supported on said frame, one of the arms of said rocker arm being disposed in the path of movement of said operating arm, the other of the arms of said rocker arm being connected to resilient means restraining the movement of said one end of said operating arm by said means for operating said operating arm and means for varying the resilient force exerted by said resilient means.

22. The apparatus of claim 20 including a service pan for retaining a supply of butter, pump means for pumping butter from said service pan into a baking pan comprising a pump and operating rod for said pump, means for resiliently connecting said operating rod to said operating arm for operation of said pump operating rod by said operating arm.

23. The apparatus of claim 20 including a container for retaining a supply of cooking oil, pump means for pumping said cooking oil into a pan supported in the path of movement of said cutter blades and into which said cutter blades are movable when there is no baking pan on said support, means for operating said pump comprising a pump rod, resilient means normally urging said rod to move said pump rod in a first direction, latch means normally restraining said pump rod against the influence of said resilient means, means connected to said latch means engageable by said means for operating said operating rod for releasing said latch means and releasing said pump rod for movement of said pump rod under the influence of said resilient means.

24. A dough dividing machine comprising a frame, a baking pan support, a cutter, an operating arm connected to said cutter and operable to move said cutter toward said support, a second pan for containing cooking oil, said cutter being movable into said second pan, a container for cooking oil, a pump for pumping oil from said container to said second pan, means for operating said operating arm, said pump being operably connected to said means for operating said pump arm by means including a pump rod, an operating means connected to said pump rod, and means connected to said operating arm intermittently engageable with said operating means during movement of said operating arm.

25. The apparatus of claim 24 in which the operating means connected to said pump rod includes a resilient means compressible through movement of said operating arm to absorb energy from said operating arm and operable to urge said pump rod in a direction to operate said pump to force said oil into said second pan when compressed.

26. The apparatus of claim 25 including a latch operable to latch said pump rod in a position in which said resilient means is compressed, said latch being operable to release said pump rod for operation of said pump by said resilient means.

27. The apparatus of claim 26 in which said latch is operable to release said pump rod by means movable with said operating arm.

28. The apparatus of claim 26 in which there are outlets from said pump within said container and through which said oil is forced into said container during operation of said pump by said resilient means.

References Cited in the file of this patent

UNITED STATES PATENTS

| | | |
|---|---|---|
| 991,241 | Rae | May 2, 1911 |
| 1,082,160 | Kurowski | Dec. 23, 1913 |
| 2,174,658 | Hess | Oct. 3, 1939 |
| 2,263,173 | Johnson | Nov. 18, 1941 |
| 2,627,823 | Hurley et al. | Feb. 10, 1953 |
| 2,678,613 | Jennings | May 18, 1954 |